United States Patent [19]
Mark

[11] Patent Number: 6,152,410
[45] Date of Patent: Nov. 28, 2000

[54] HINGED BRACKET

[75] Inventor: B. Jonathan M. Mark, Toronto, Canada

[73] Assignee: Soheil Mosun Limited, Ontario, Canada

[21] Appl. No.: 09/195,447

[22] Filed: Nov. 18, 1998

Related U.S. Application Data

[63] Continuation-in-part of application No. 08/944,764, Oct. 6, 1997, abandoned.

[51] Int. Cl.[7] .................................................. A47B 96/06
[52] U.S. Cl. .................................. 248/220.1; 248/282.1; 248/284.1
[58] Field of Search ................................. 248/220.1, 201, 248/282.1, 283.1, 284.1, 289.11, 291.1, 276.1, 447.1, 487, 917, 919, 922

[56] References Cited

U.S. PATENT DOCUMENTS

| | | | |
|---|---|---|---|
| 623,790 | 4/1899 | Kenyon | 248/282.1 X |
| 661,051 | 11/1900 | Horton | 248/282.1 X |
| 894,116 | 7/1908 | Choate . | |
| 1,098,822 | 6/1914 | Miller . | |
| 1,326,650 | 12/1919 | Doerr | 248/284.1 |
| 1,796,354 | 3/1931 | Ahlberg | 248/282.1 |
| 3,348,799 | 10/1967 | Junkel et al. | 248/283.1 |
| 3,408,032 | 10/1968 | Francis | 248/447.1 X |
| 3,474,991 | 10/1969 | Toubhans . | |
| 3,598,347 | 8/1971 | Marburger . | |
| 4,140,296 | 2/1979 | Guillen | 248/447.1 X |
| 4,825,857 | 5/1989 | Kenna . | |
| 5,042,766 | 8/1991 | Baker | 248/220.1 X |
| 5,321,579 | 6/1994 | Brown et al. | 248/284.1 X |
| 5,772,174 | 6/1998 | Hirsch et al. | 248/447.1 |
| 6,012,693 | 1/2000 | Voeller et al. | 248/280.11 |
| 6,059,417 | 5/2000 | Tatoian | 359/856 |

FOREIGN PATENT DOCUMENTS

| | | | |
|---|---|---|---|
| 203385 | 6/1939 | Switzerland | 248/284.1 |

*Primary Examiner*—Anita M. King
*Assistant Examiner*—N. Sanders
*Attorney, Agent, or Firm*—Nixon & Vanderhye P.C.

[57] ABSTRACT

This invention relates to brackets, and, in particular, to hinged brackets that support an object, such as a monitor, across a corner defined by two walls joined along an edge, and, in the preferred embodiment, with the object at an angle to a plane opposite the corner which forms with the walls a triangle in plan view. The bracket comprises a base anchoring the bracket to a wall, and an extension from the base presenting a distal edge for connecting the monitor to the bracket, and in the preferred embodiment, with the distal edge at an angle to the plane opposite the corner. The extension is pivotally connected to the base so that the distal edge is moved, when the extension and the base are displaced with respect to one another about the pivotal connection, from a position parallel to the plane opposite the corner to a position parallel to a plane presented by a wall.

29 Claims, 4 Drawing Sheets

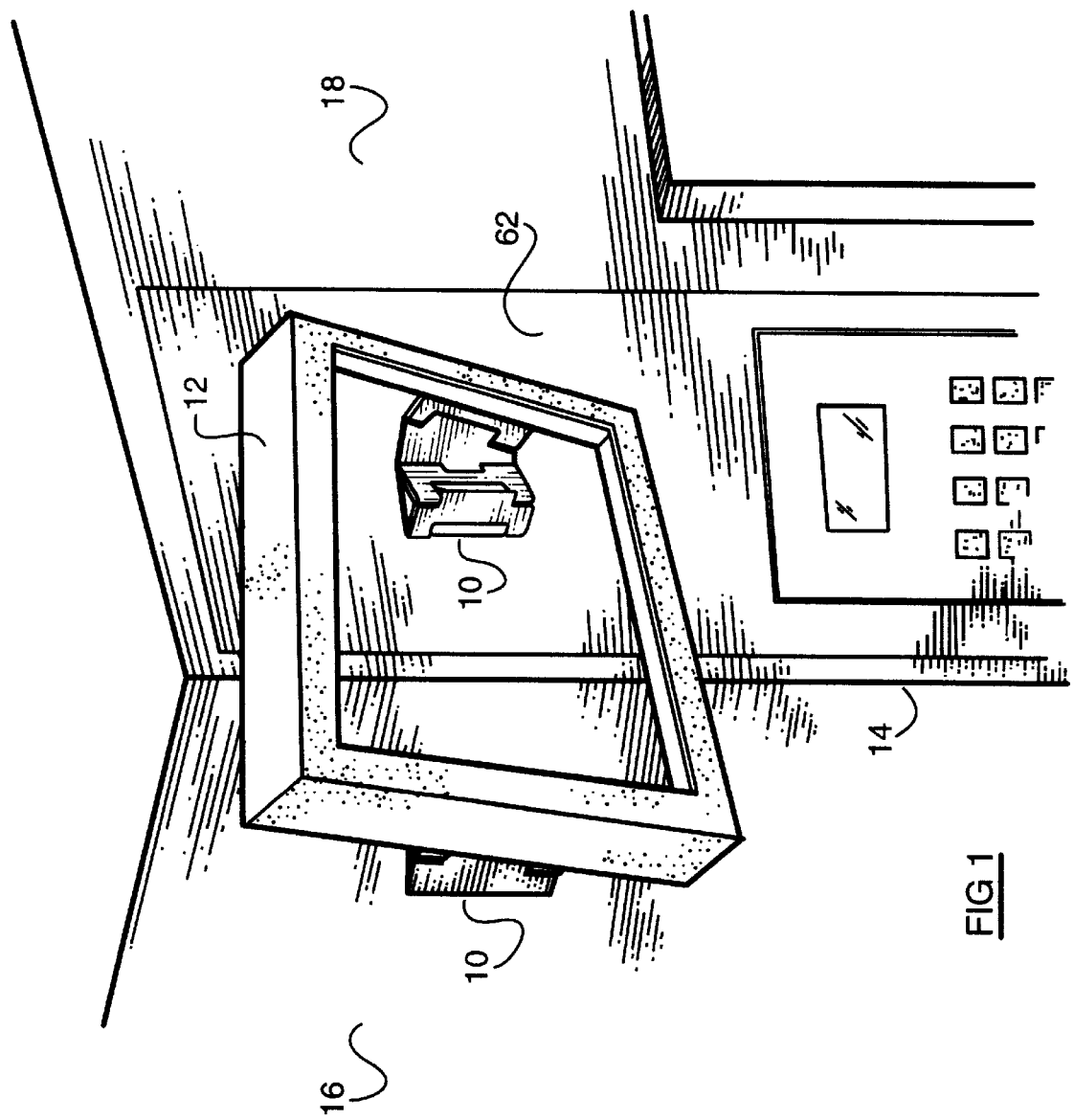

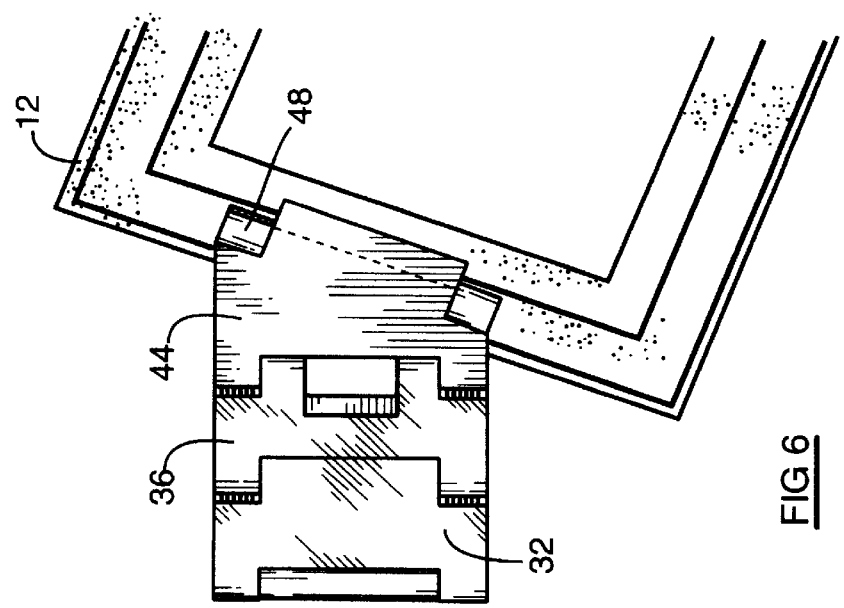
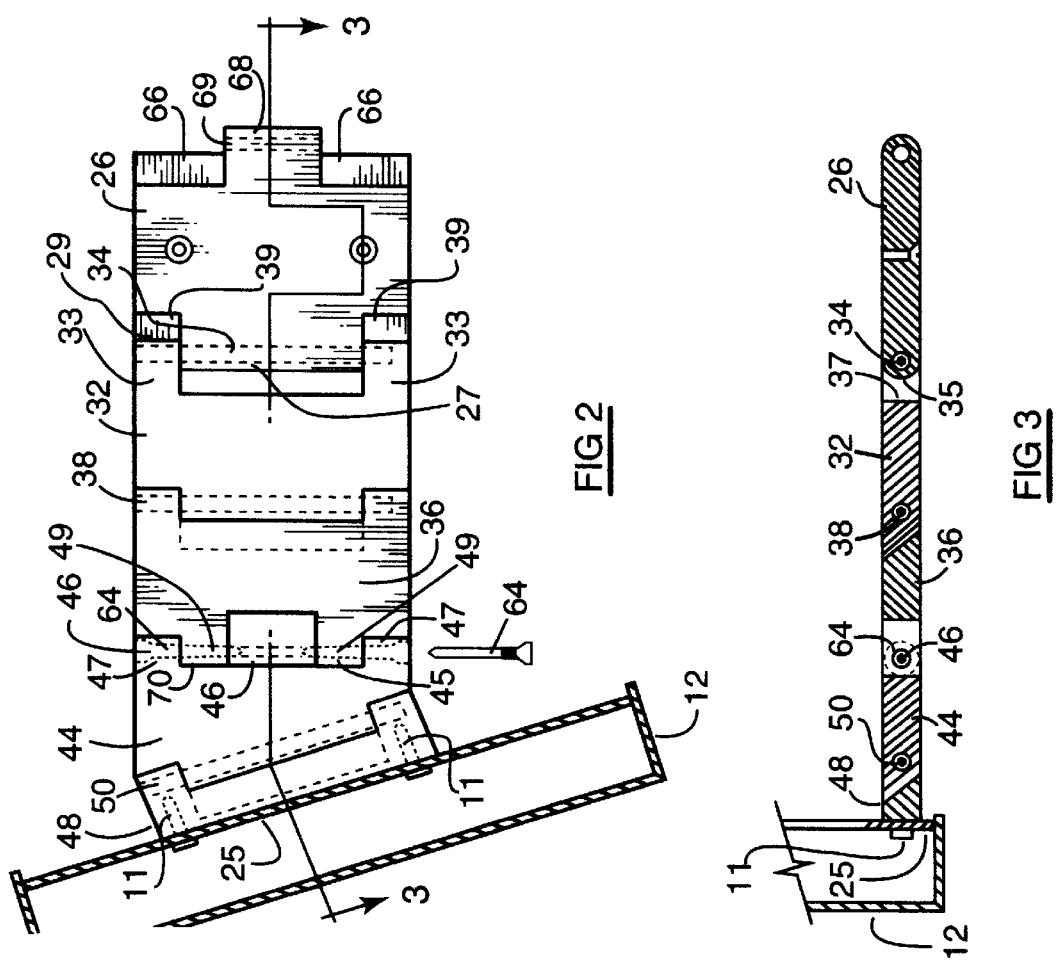

HINGED BRACKET

CROSS REFERENCE TO RELATED APPLICATION

This application is a continuation-in-part of application Ser. No. 08/944,764, filed Oct. 6, 1997, now abandoned.

FIELD OF THE INVENTION

This invention relates to brackets, and, in particular, to hinged brackets that support an object, such as a monitor, across a corner defined by two walls joined along an edge, and, even more particularly, with the object at an angle to a plane opposite the corner which forms with the walls a triangle in plan view. It is to be appreciated that although this application primarily discusses the invention as a bracket for supporting a monitor in an enclosure, such as an elevator, it is not to be limited to such use.

BACKGROUND OF THE INVENTION

There are many kinds of brackets which support a monitor across a corner. Of particular relevance to this disclosure, however, are those brackets which support a monitor in an enclosure, such as an elevator, wherein one of the walls presents a control panel. It is common for the control panel to extend up the wall behind the monitor. Any person seeking access to the interior of the control panel is frustrated by the monitor which interferes with opening the control panel. Moreover, a monitor must be mounted in a stable manner with little or no movement which causes deterioration of a video signal to the display unit.

One solution is to custom install each monitor in an elevator. This is an unattractive alternative: the labour and costs of custom manufacturing a bracket for differing styles of elevators and the associated control panel is inefficient for large scale economies.

This invention is directed towards an improved hinged bracket which is universal in its application to support monitors in an elevator, yet allows the monitor to be readily swung out of the way so that an operator can access the control panel as desired. This also allows for ready access to the rear of the monitor for easy servicing. Moreover, the bracket of this invention supports the monitor in a stable manner resulting in little or no video signal deterioration.

SUMMARY OF THE PRESENT INVENTION

Accordingly, a bracket is provided for mounting an object having an object plane, such as a monitor, to two walls inclined relative to one another, the object being separately mountable to each wall and the bracket mounting the object to one wall. The improved bracket comprises:

a base anchoring the bracket to a wall;

an extension from the base including a proximal edge and a distal edge, the extension being pivotally connected to the base along the proximal edge; and mounting means provided on the distal edge of the extension, for mounting the object to the extension, such that, with the object mounted to both walls and with the bracket mounting the object to one wall, the object plane is inclined to both walls and the extension enables the object to be pivoted away from the other wall with the object supported solely by the bracket, to a position in which the object plane is substantially parallel to the one wall.

In particular, the base comprises first and second planar parts, with one edge of the second part being connected to one edge of the first part and the second part being pivotally connected to the extension along another opposite edge. The arrangement is such that the pivotal connection to the extension is spaced from the one wall.

The extension comprises third and fourth planar parts, which are pivotally connected to one another, with the third part being pivotally connected to the second part and the fourth part being connected to the mounting means.

Further, the first part includes along another edge, opposite the one edge thereof, a first coupling means, and wherein the pivotal connection between the third and fourth parts includes a second, complementary coupling means. The first and second coupling means are coupled to one another, whereby the first, second and third parts form a triangle, to support the object This increases the stability of the object being mounted.

Moreover, the first coupling means comprises a projection provided with a bore, wherein the third and fourth parts include bores, and wherein at least one screw is provided, providing the second coupling means and extending through the bores of the third and fourth parts to provide the pivotal connection therebetween and into the bore of the first coupling means to couple the first and second coupling means together.

A fifth part is pivotally connected to the fourth part along one edge thereof and has the mounting means provided on another, opposite edge.

The mounting means is provided at an angle, such that, when mounted on walls perpendicular to a common reference plane, the object plane is at a non-perpendicular angle to the reference plane.

Moreover, the pivot axes between the second and third parts and between the third and fourth parts are parallel to one another. The pivot axes between the fourth and fifth parts is inclined at an angle relative to the other pivot axes but generally parallel to the mounting means.

In a preferred embodiment, the first and second parts are pivotally connected to one another.

Further, the second and third parts are generally planar, and can pivot through an angled 90 between a position in which the second and third are generally coplanar with one another and a position in which they are substantially perpendicular to one another. Moreover, the second and third parts include chamfered edges preventing rotation beyond the coplanar position.

The third and fourth parts can pivot through substantially 180 relative to one another between two opposite positions in each of which the third and fourth parts are generally perpendicular to one another.

The fourth and fifth parts are generally planar and can pivot relative to one another through substantially 90, between a position in which the fourth and fifth parts are generally coplanar with one another, and a position in which they are generally perpendicular to one another. Moreover, the fourth and fifth parts present chamfered edges to one another to prevent rotation beyond the coplanar position.

In the preferred embodiment, the first and second parts include means limiting pivotal rotation beyond a predetermined acute angle. In particular, the first part includes chamfered surfaces limiting rotation of the second part relative thereto.

Moreover, a method is provided of pivoting an object having an object plane from a first position in which the object plane is opposite a corner defined by two walls inclined relative to one another to a second position in which the object plane is parallel to a plane presented by one of the walls, wherein the object is mounted to the respective walls by first and second brackets with said second bracket presenting a base to anchor said second bracket to a wall and an extension for connecting to said object which is pivotally connected to said base, the method comprising:

detaching said object from said first bracket; and displacing said extension and said base of said second bracket with respect to one another about said pivotal connection to move said object from the first position to the second position. The extension is pivotally connected to the base so that the distal edge is moved, when the extension and the base are displaced with respect to one another about the pivotal connection, from a position parallel to the plane opposite the corner to a position parallel to a plane presented by a wall

BRIEF DESCRIPTION OF THE DRAWING FIGURES

For a better understanding of the present invention and to show more clearly how it may be carried into effect, reference will now be made, by way of example, to the accompanying drawings, which show a preferred embodiment of the present invention and in which:

FIG. 1 is a perspective view illustrating a typical installation of a monitor across a corner defined by two walls of an elevator joined along an edge;

FIG. 2 is a side elevational view of the bracket of this invention in an extended position;

FIG. 3 is a sectional view taken along the lines 3—3 of FIG. 2;

FIG. 6 is a side elevational view of the bracket supporting the monitor as illustrated in FIG. 5.

DESCRIPTION OF PREFERRED EMBODIMENT

Figure 4:
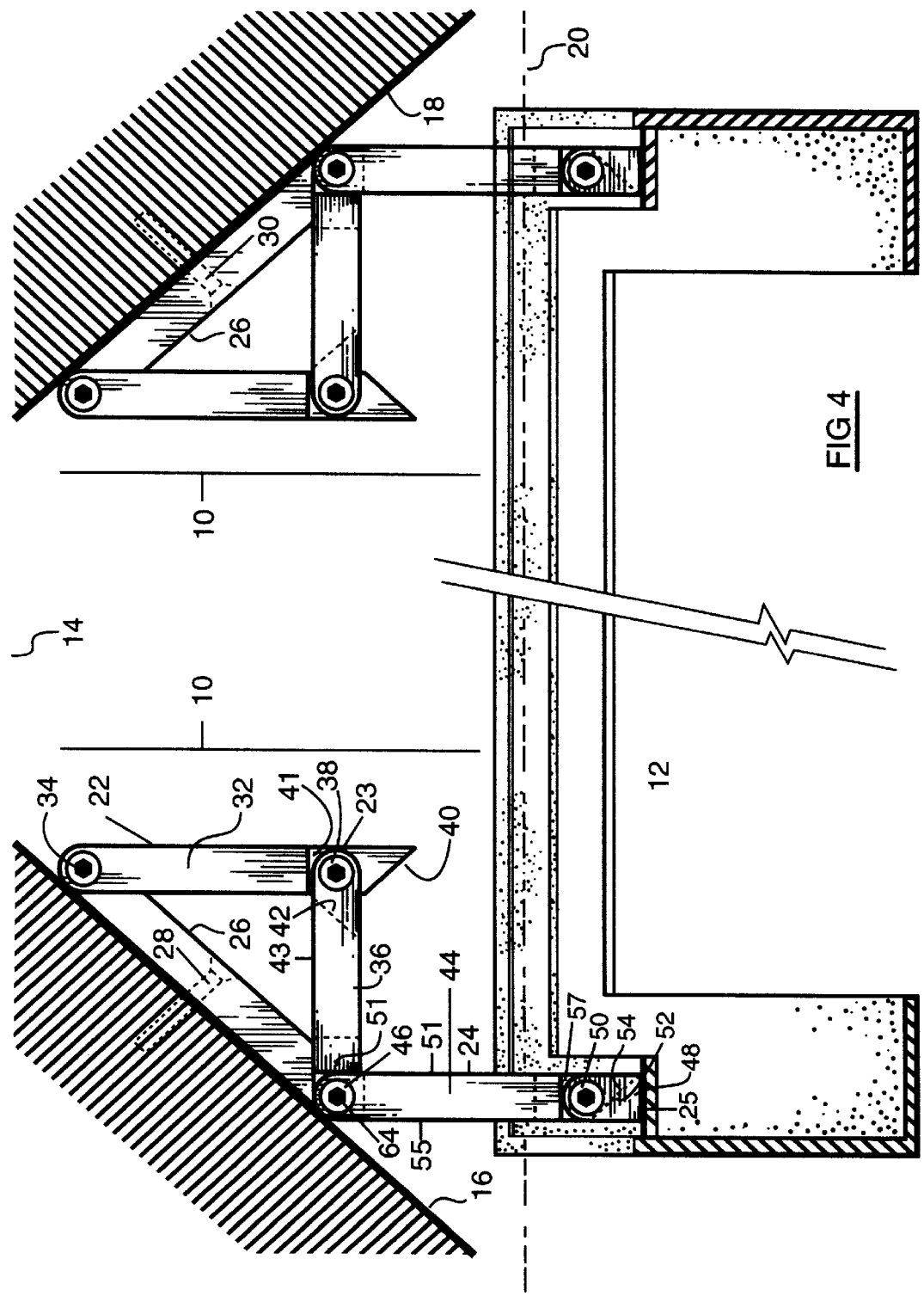
FIG. 4 is enlarged top view of a typical installation as illustrated in FIG. 1.

A bracket 10 of this invention is shown in use in FIG. 4. This shows the bracket in a configuration supporting a monitor 12 across a corner 14 defined by two walls 16, 18, respectively, joined along an edge. The monitor 12 lies transverse to the walls along a plane opposite corner 14 which, in section in the plan view of FIG. 4, forms a triangle with the walls 16, 18. Here, the walls 16, 18 provide planar surfaces that are at an angle to one another and that are perpendicular to a reference plane, here a horizontal plane. A further vertical plane 20 extends across the corner at an angle to the walls 16, 18 and is also perpendicular to the reference plane. In the preferred embodiment the monitor is angled with respect to plane 20 downwardly at an angle of 20°. The monitor can be considered to be an object with an object plane that is at an angle of 20° to the plane 20. This is optimal to allow a person standing in a typical elevator installation to view the monitor, which is typically mounted with the top of the monitor seven feet above the ground. Other angles are contemplated for this invention, however, as would be known to those skilled in the art depending on the circumstances surrounding the installation.

It can be appreciated that most installations place the monitor across a square corner. In this instance the plane 20 is the hypotenuse opposite corner 14. Moreover, most installations have the plane 20 and the walls 16, 18, respectively, forming an isosceles triangle with the distance of the walls 16, 18, respectively, from the corner 14 to where the plane 20 intersects such walls being the two sides of equal length. However, the bracket can be used and/or configured for use in other situations, where the corner is not a right angle and where an isosceles triangle is not formed.

The bracket 10 of this invention can be provided either as a left side bracket or a right side bracket. These are identical except that the left side bracket is the mirror image of the right side bracket. The following description is applicable to either the left or right side bracket.

The bracket 10, of this invention, comprises a base 22 for anchoring the bracket 10 to the wall 16 or 18, and an extension 24 from base 22 which connects the base 22 to the monitor 12. The distal edge 25 of extension 24 is preferably angled to plane 20, and in the preferred embodiment, this angle is 20°. In order to displace monitor from its position illustrated in FIG. 4 to the position illustrated in FIG. 5, the extension 24 is pivotally connected at its proximal edge 23 to the base 22, as will hereinafter be explained.

The base 22 has a first planar part 26 anchored to wall 16 or 18, as the case may be, through use of suitable anchoring screws 28, 30, respectively, all as is well known in the art. A second planar part 32, of the base 22, is pivotally connected along one edge to first planar part 26 at 34. The first planar part 26 and second planar part 32 can pivot through substantially 180° with respect to one another.

Figure 5:
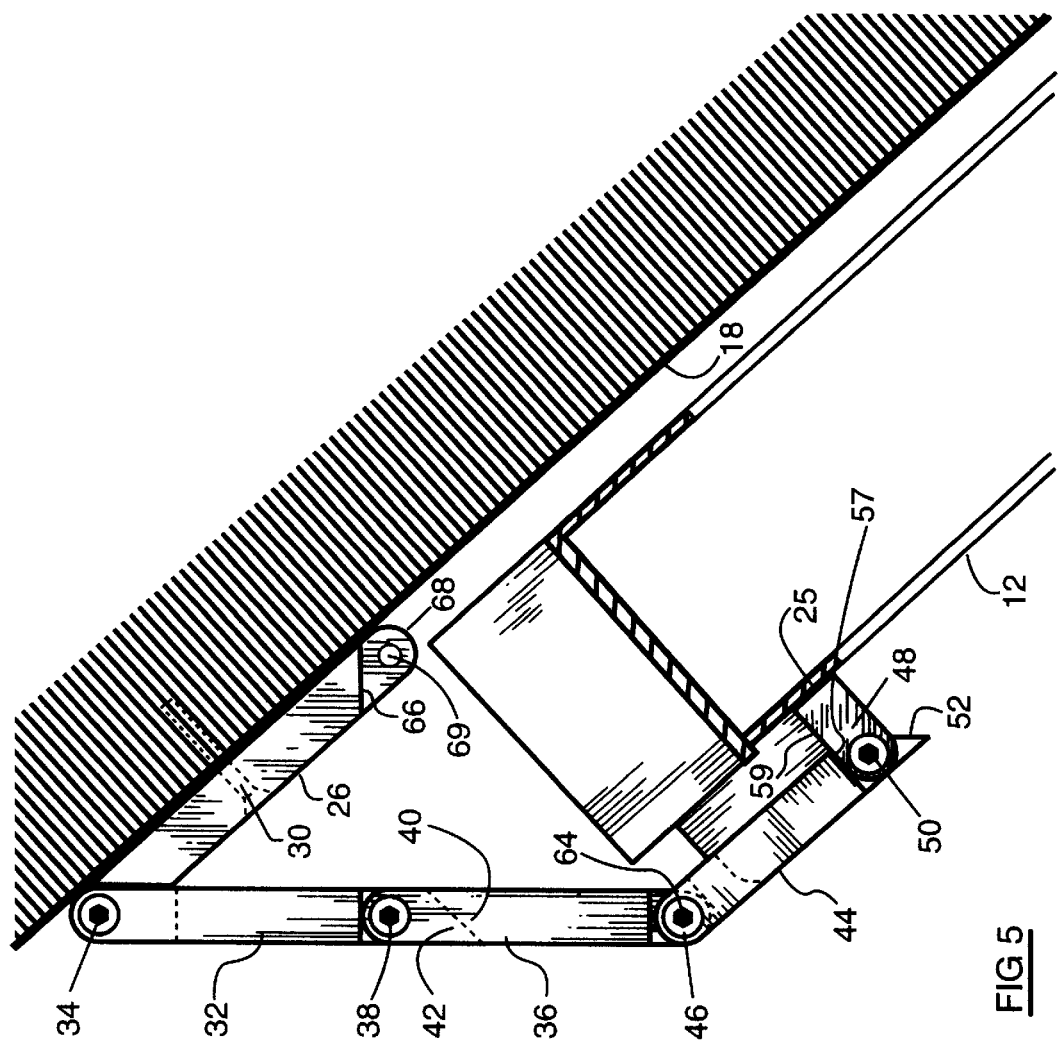
FIG. 5 is an enlarged top view of the right bracket illustrated in FIG. 4 with the bracket supporting the monitor in a second position parallel to a wall of the elevator.

As best shown in FIG. 2, the pivot connection between the first and second planar parts 26, 32 comprises a central projection 27 of the part 26, and a pair of short arms 33 of the second planar part 32, which arms extend on either side of the projection 27. A pivot pin 29 extends through the arms 33 and the projection 27, and as shown the lowermost arm 33 can have a blind bore, to assist in retaining the pivot pin 29 in position. This forms a hinge mechanism in known manner. Here, the end of the central projection is round as indicated at 35 and the facing surface 37 of the second planar part 32 is flat and spaced therefrom. On either side of the central projection 27, the first part 26 has chamfered surfaces 39 angled at 45° to limit pivotal movement of the second part 32, as shown in FIG. 5.

On its opposite edge, the first part 26 includes chamfered surfaces 66 again angled at 45°, and another projection 68 which is shorter in height and does not extend outwardly as far as the central projection 27, and the projection 68 has a bore 69. The function of these features is detailed below.

The first part 26 is symmetrical about a horizonal center line, so that it can be inverted for use in either a left hand or right hand bracket.

The extension 24 includes a third planar part 36 pivotally connected to another edge of the second planar part 32 at 38 and this forms the pivot connection between the base 22 and the extension 24. The third planar part 36 pivots 90° with respect to second planar part 32 between a position coplanar with second planar part 32 (see FIG. 5) to a position at right angles to the second planar part 32 (see FIG. 4). Like the connection between the first two parts, the second part 32 includes a central projection and the third part 36 includes arms, to form a pivot connection. The second planar part 32 presents a chamfered edge 40 on its central projection and the third planar part presents a chamfered edge 42, both at a 45° angle to the respective parts, to stop the third planar part from rotating beyond a position where the two parts are coplanar, i.e. to prevent rotation beyond a common plane (see FIG. 5). Distal edges 41 of the second planar part 32 abuts sides 43 of the arms of the third planar part 36 to stop the third planar part 36 from rotating beyond 90° with respect to the second planar part (see FIG. 4).

The extension 24 includes a fourth planar part 44 pivotally connected to the third planar part 36 as at 46, and a fifth planar part 48 pivotally connected to fourth planar part 44, as at 50. The fourth planar part 44 can pivot through 180° with respect to the third planar part 36. The fourth planar part 44 is prevented from pivoting beyond 180° with respect to the third planar part by distal edges 51 of the third planar part 36 abutting either side 53 or 55 of arms of the fourth planar part 44 (see FIG. 4 showing distal end 51 abutting side 53).

The third planar part 36 includes a central projection 45 (see FIG. 2) which includes an opening 46. Correspondingly, the fourth planar part 44 includes arms 47 on either side of the central projection 70. As shown, both the central projection 45 and the arms 47 have bores 49 aligned with one another and the bores 49 open into the central opening 46. The bores in the arms 47 are threaded for engagement with threaded portions of screws 64. The screws 64 include plain end portions for a sliding fit in the bores of the central projection 45 and which extend into the central opening 46. This holds the pieces together yet allows for full disengagement or partial disengagement as will hereinafter be explained.

The fifth planar part 48 can pivot 90° with respect to fourth planar part 44 from a position coplanar with the fourth planar part (see FIG. 4) to a position at right angles to the fourth planar part (see FIG. 5). In the preferred embodiment fourth planar part presents a chamfered edge 52 on a central projection and the fifth planar part presents centrally a chamfered edge 54, both at a 45° angle, to stop the fifth planar part from rotating beyond a position coplanar with respect to the fourth planar part. A distal edge 57 of fourth planar part 44 abuts sides 59 of arms of the fifth planar part 48 to stop the fifth planar part from rotating beyond 90° with respect to the fourth planar part (see FIG. 5).

The fourth and fifth parts 44, 48 are pivotally connected at 50, along an axis that is inclined and provides the inclination to the plane 20 as illustrated in FIG. 4. Thus, this axis here is at an angle of 20° to plane 20. The fifth part 48 then provides the distal edge surface 25 which is parallel to this pivot axis, as shown in FIG. 2.

In use, a pair of left and right hand brackets 10 are mounted as shown in FIG. 4. Here, the third planar part 36, at its connection to the fourth part 44, is removably connected to first planar part 26, as will hereinafter be explained. This connection strengthens the base to support the monitor. Moreover, as best illustrated in FIG. 4, when third planar part is connected to first planar part, each fourth planar part 44 extends away from wall 16 or 18, as the case may be, at an angle 90° to third planar part 36. Hence, the fourth planar parts 44 are prevented from pivoting beyond 90 with respect to the respective third planar parts 36, since sides 53 of fourth planar part abut distal edge 51 presented by third planar part 36. By fixing the extent of the pivot of fourth planar parts with respect to the third planar parts, it will be appreciated that the left and right brackets 10 in a typical installation cooperate to rigidly secure the monitor in position and resist lateral displacement. As shown, the monitor 12 is rigidly secured, by bolts 11, or other suitable mounting means, to the distal edge surfaces 25 of the fifth parts 48 of the two brackets.

The junction of third and fourth parts 36, 44 is connected to the first part 26 by having the screws 64 extend into the bore 69 of the projection 68 of the first part 26. As shown in FIG. 4, the third part 36 then abuts the 45° chamfered surfaces 66 of the first part 26. Thus, the projection 68 and bore 69 provide a first coupling means and the screws 64 provide a second coupling means.

Commonly, as indicated in FIG. 1, in an elevator, a control panel 62 is provided on the wall 18, adjacent the corner. Hence, when a person enters an elevator and wants to access a control panel 62 for repair, the monitor must first be moved to a position that permits access to the control panel. The method of performing this task is as follows. First, the fourth planar part 44 of the bracket on wall 16 (the one which does not house control panel 62) is separated from first planar part 26 by removing the fastening means, the part-threaded screws 64, as is well known in the art. This frees the monitor 12, together with the fourth and fifth parts 44, 48 of the left hand bracket from the base 22 of that bracket, allowing monitor 12 to pivot about the right hand bracket on wall 18 which houses the control panel 62.

Next, the part threaded screws 64 of the right hand bracket 10 on wall 18 (the one which houses control panel 62) are partly removed (see FIG. 2). This allows third planar part 36 to detach from first planar part 26, yet retain its pivotal connection with fourth planar part 44, so as to continue to support the monitor 12.

As illustrated in FIG. 5, the monitor 12 is swung around towards the wall 18, so that third planar part 36 is rotated until generally coplanar with the second planar part 32. The fourth planar part 44 is then at a slight angle to the third planar part 36, and the fourth and fifth planar parts 44, 48 are rotated until they are 90° with respect to one another, with the monitor 12 facing the wall 18. The angles between the first and second planar parts and the third and fourth planar parts can be adjusted, depending on the thickness of the monitor 12, so that the monitor 12 is essentially flat against the wall 18. The control panel 62 can now be opened, and the bracket 10 and monitor 12 swing with the control panel 62.

The foregoing description of the preferred embodiment is intended to be illustrative of the novel features of this invention. It would be appreciated by those skilled in the art, that one may make obvious departures and substitutions from this embodiment while retaining the essence of this invention. The true scope of this invention may be determined from reading the specification, including the claims, as a whole, in light of the relevant art.

In particular, while the invention has been described with two essentially symmetrical brackets 10, it will be appreciated that the full bracket structure is only required for the right hand bracket 10 on the control panel 62. On the left hand side all that is required is a bracket supporting the monitor 12 and capable of releasing one edge of the monitor 12. It will also be appreciated that the pivot connection between the first and second parts 26, 32 is not essential and could be omitted.

I claim:

1. A bracket for mounting an object to a wall, the object having an object plane, and the wall inclined relative to a reference plane, the bracket comprising:

a base for anchoring the bracket to the wall;

an extension, extending from the base and comprising a proximal edge and a distal edge, the extension being pivotally connected to the base along the proximal edge so that the extension pivots in the direction of the reference plane, the distal edge provided at an angle to the reference plane; and a mounting means provided on the distal edge of the extension for mounting the object to the extension, wherein the bracket mounts the object in a position transverse to the wall with the object plane at an angle to the reference plane, and the extension enables the object to be pivoted towards the wall in a position where the object plane is substantially parallel to the wall.

2. A bracket as claimed in claim 1 wherein the distal edge is pivotally connected to the extension and the pivot axis is at an angle to the reference plane.

3. A bracket as claimed in claim 2, wherein the base comprises first and second planar parts, with one edge of the second part being connected to one edge of the first part and the other edge of the second part being pivotally connected to the proximal edge of the extension.

4. A bracket as claimed in claim 3, wherein the extension comprises third and fourth planar parts, which are pivotally connected to one another, with the third part being pivotally connected to the second part and the fourth part being connected to the mounting means.

5. A bracket as claimed in claim 3 wherein the first and second parts are pivotally connected to one another.

6. A bracket as claimed in claim 5, wherein the first and second parts comprise means limiting pivotal rotation beyond a predetermined acute angle.

7. A bracket as claimed in claim 6, wherein the first part comprises a chamfered surface preventing rotation of the second part beyond a predetermined acute angle.

8. A bracket as claimed in claim 4, further comprising:
a first coupling means provided along the other edge of the first part opposite the one edge thereof; and
a second coupling means provided along the pivotal connection between the third part and the fourth part,
wherein when the first and second coupling means are coupled to one another, the first, second, and third parts form a triangle to support the object.

9. A bracket as claimed in claim 8, wherein the first coupling means comprises a projection provided with a bore, and wherein the third and fourth parts include bores, and the bracket further comprises at least one screw that extends through the bores of the third and fourth parts to provide the pivotal connection therebetween and into the bore of the projection to couple the first and second coupling means together.

10. A bracket as claimed in claim 9, wherein the extension further comprises a fifth part pivotally connected to the fourth part along one edge thereof and having the mounting means provided on another, opposite edge.

11. A bracket as claimed in claim 10, wherein the second and third parts can pivot through substantially an angle of 90° between a position in which the second and third parts are generally coplanar with one another and a position in which they are substantially perpendicular to one another.

12. A bracket as claimed in claim 11, wherein the third and fourth parts can pivot through substantially an angle of 180° relative to one another between two opposite positions in each of which the third and fourth parts are generally perpendicular to one another.

13. A bracket as claimed in claim 11, wherein the second and third parts comprise chamfered edges that prevent rotation beyond the coplanar position.

14. A bracket as claimed in claim 10, wherein the pivot axes between the second and third parts and between the third and fourth parts are parallel to one another, and wherein the pivot axes between the fourth and fifth parts is inclined at an angle relative to the pivot axes between the second and third parts and between the third and fourth parts and is generally parallel to the mounting means.

15. A bracket as claimed in claim 10, wherein the fourth and fifth parts can pivot relative to one another through substantially an angle of 90°, between a position in which the fourth and fifth parts are generally coplanar with one another, and a position in which they are generally perpendicular to one another.

16. A bracket as claimed in claim 15, wherein the fourth and fifth parts comprise chamfered edges presented to one another to prevent rotation beyond the coplanar position.

17. A combination comprising: two walls inclined relative to one another and perpendicular to a common reference plane;
a pair of mounting brackets, which are generally symmetrical, with one mounting bracket mounted on one wall and the other mounting bracket mounted on the other wall, each bracket comprising:
a base for anchoring the bracket to the respective wall;
an extension extending from the base and comprising a proximal edge and a distal edge,
the extension being pivotally connected to the base along the proximal edge so that the extension pivots in the direction of the reference plane, and
the distal edge provided at an angle to the reference plane;
mounting means provided on the distal edge; and
an object mounted to the mounting means of the brackets, the object having an object plane,
wherein the extension of one bracket enables the object to be pivoted from a position transverse to the walls with the object plane at an angle to the reference plane away from the wall supporting the other bracket to a position in which the object plane is substantially parallel to the wall supporting the one bracket, with the object solely supported by the one bracket.

18. A method of pivoting an object having an object plane from a first position in which the object plane is opposite a corner defined by two walls inclined relative to one another to a second position in which the object plane is parallel to a plane presented by one of the walls, wherein the object is mounted to the respective walls by first and second brackets with said second bracket presenting a base to anchor said second bracket to a wall and an extension pivotally connected to the base for connecting to the object, the method comprising:
detaching said object from said first bracket; and
displacing said extension and said base of said second bracket with respect to one another about said pivotal connection to move said object from the first position to the second position.

19. A bracket for mounting an object to a wall, the object having an object plane, and the wall inclined relative to a reference plane, the bracket comprising:
a base for anchoring the bracket to the wall, the base comprising a first coupling means;
an extension extending from the base, the extension comprising a proximal edge, a distal edge and a second coupling means, the extension being pivotally connected to the base along the proximal edge so that the extension pivots in the direction of the reference plane; and
mounting means provided on the distal edge for mounting the object to the extension,
wherein the extension enables the object to pivot to a position transverse to the wall with the first and second coupling means coupled to one another to support the object and wherein the bracket mounts the object in a position transverse to the wall with the object plane at an angle to the reference plane, and the extension enables the object to be pivoted towards the wall in a position where the object plane is substantially parallel to the wall.

20. A bracket as claimed in claim 19 wherein the base comprises first and second planar parts, with one edge of the second part being connected to one edge of the first part and the other edge of the second part being pivotally connected to the proximal edge of the extension.

21. A bracket as claimed in claim 20, wherein the extension comprises third and fourth planar parts which are pivotally connected to one another, with the third part being pivotally connected to the second part and the fourth part being connected to the mounting means.

22. A bracket as claimed in claim 21, wherein the first coupling means is provided along the other edge of the first part opposite the one edge thereof, and the second coupling means is provided along the pivotal connection between the third part and the fourth part, so that when the first and second coupling means are coupled to one another, the first, second, and third parts form a triangle to support the object.

23. A bracket as claimed in claim 22, wherein the first coupling means comprises a projection provided with a bore, and wherein the third and fourth parts include bores, and the bracket further comprises at least one screw that extends through the bores of the third and fourth parts to provide the pivotal connection therebetween and into the bore of the projection to couple the first and second coupling means together.

24. A bracket as claimed in claim 22, wherein the second and third parts can pivot through substantially an angle of 90° between a position in which the second and third parts are generally coplanar with one another and a position in which they are substantially perpendicular to one another.

25. A bracket as claimed in claim 24, wherein the third and fourth parts can pivot through substantially an angle of 180° relative to one another between two opposite positions in each of which the third and fourth parts are generally perpendicular to one another.

26. A bracket as claimed in claim 24, wherein the second and third parts comprise chamfered edges that prevent rotation beyond the coplanar position.

27. A bracket according to claim 19 wherein the base comprises first and second parts; and wherein the first and second parts are pivotally connected to one another.

28. A bracket as claimed in claim 27, wherein the first and second parts comprise means limiting pivotal rotation beyond a predetermined acute angle.

29. A bracket as claimed in claim 28, wherein the first part comprises a chamfered surface preventing rotation of the second part beyond a predetermined acute angle.

* * * * *